(12) United States Patent
Wan et al.

(10) Patent No.: US 8,060,831 B2
(45) Date of Patent: Nov. 15, 2011

(54) USER INTERFACE VISUAL CUE FOR USE WITH LITERAL AND NON-LITERAL VALUES

(75) Inventors: Samuel S. Wan, Seattle, WA (US); Charles W. Parker, Sammamish, WA (US); Aaron P. Jasinski, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 11/771,902

(22) Filed: Jun. 29, 2007

(65) Prior Publication Data

US 2009/0007008 A1 Jan. 1, 2009

(51) Int. Cl.
G06F 3/00 (2006.01)
G06F 3/048 (2006.01)

(52) U.S. Cl. .......................... 715/762; 715/763; 715/765

(58) Field of Classification Search .......... 715/762–763, 715/765, 781, 205, 234; 705/28; 707/102
See application file for complete search history.

(56) References Cited

U.S. PATENT DOCUMENTS

| | | | |
|---|---|---|---|
| 5,487,141 A | 1/1996 | Cain et al. | |
| 5,544,288 A | 8/1996 | Morgan et al. | |
| 5,555,365 A | 9/1996 | Selby et al. | |
| 5,673,401 A | 9/1997 | Volk et al. | |
| 6,104,393 A | 8/2000 | Santos-Gomez | |
| 6,215,488 B1 | 4/2001 | Bloem et al. | |
| 6,262,729 B1 | 7/2001 | Marcos et al. | |
| 6,262,734 B1 | 7/2001 | Ishikawa | |
| 6,330,007 B1 | 12/2001 | Isreal et al. | |
| 6,633,888 B1 * | 10/2003 | Kobayashi | 707/103 R |
| 6,700,591 B1 * | 3/2004 | Sharpe | 715/762 |
| 6,993,475 B1 | 1/2006 | McConnell et al. | |
| 6,996,800 B2 | 2/2006 | Lucassen et al. | |
| 6,999,963 B1 | 2/2006 | McConnell | |
| 7,194,680 B1 * | 3/2007 | Roy et al. | 715/205 |
| 2002/0124115 A1 | 9/2002 | McLean et al. | |
| 2003/0001904 A1 | 1/2003 | Rosen et al. | |
| 2006/0117265 A1 | 6/2006 | Omi et al. | |
| 2007/0078735 A1 | 4/2007 | Wan et al. | |

FOREIGN PATENT DOCUMENTS

DE WO2005059743 A1 2/2006

OTHER PUBLICATIONS

"Creating Graphical User Interfaces Previous Page Next Page GUIDE: A Brief Introduction" p. 1.
"Simulation, Training, and Game Editor (STAGE) Graphical User Interface" Aug. 29, 2005, Version 1.1, BMH Associates, Inc., pp. 1-15.

* cited by examiner

Primary Examiner — William Bashore
Assistant Examiner — Andrew Tank

(57) ABSTRACT

A property value associated with a property of a graphical object is retrieved. A visual cue associated with the property value is displayed, wherein the visual cue indicates whether the property value is a literal value or a non-literal value.

20 Claims, 10 Drawing Sheets

US 8,060,831 B2

USER INTERFACE VISUAL CUE FOR USE WITH LITERAL AND NON-LITERAL VALUES

BACKGROUND

Graphical authoring tools may be used to create and to edit graphical objects. A graphical authoring tool often has a User Interface (UI) with various controls for changing the properties of a graphical object. However, the user interfaces of most graphical authoring tools fail to efficiently utilize the limited space in a UI and cram numerous controls into a small space that is cluttered and difficult to use.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to a user interface visual cue for use with literal and non-literal values. The visual cue, such as a property marker, allows the use of familiar, single-purpose controls for editing literal values of properties while supporting multiple kinds of non-literal values without cluttering the user interface.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
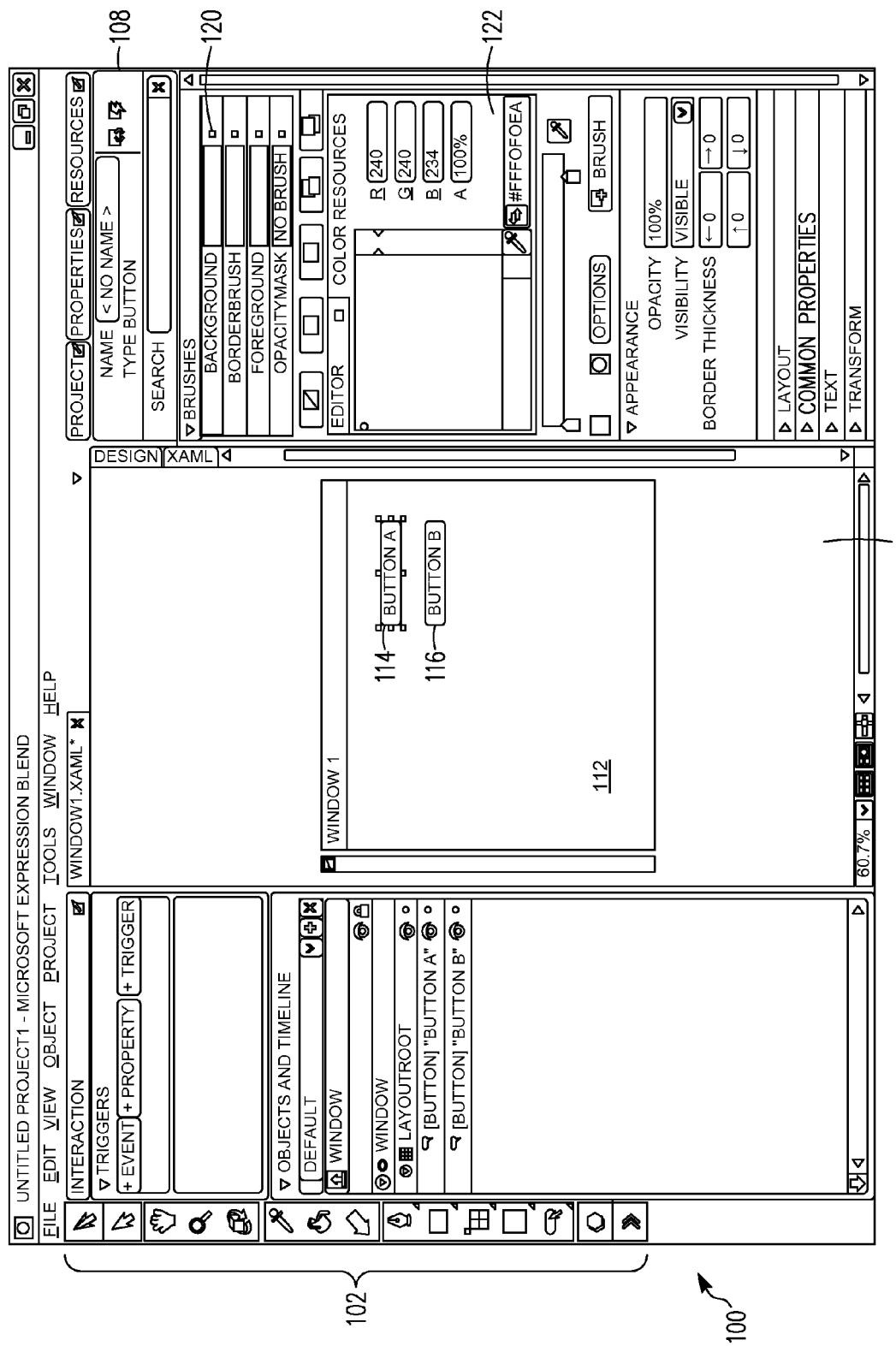
FIG. 1 is a user interface in accordance with an embodiment of the invention.

FIG. 1 shows a UI 100 for use with a graphical authoring tool in accordance with an embodiment of the invention. In one example, a graphical authoring tool may be used to create user interfaces for client applications, web-based applications, and the like. FIGS. 1-8 show a UI for graphical authoring tool Microsoft® Expression Blend™. However, it will be understood that embodiments of the invention are not limited to use with an Expression Blend UI. Further, it will be understood that embodiments of the invention may be used with other applications in addition to graphical authoring tools.

UI 100 includes user interface elements, such as artboard 106, panel 108, toolbox 102, authoring views, and menus. Toolbox 102 includes numerous icons, such as a pointer for selecting objects in the UI, a hand for panning in the UI, a magnifying glass for zooming in/out in artboard 106, a pen icon for drawing on artboard 106, a paint bucket for coloring objects, and so on. Artboard 106 holds a project 112 (i.e., application document). Project 112 includes graphical object 114 ("Button A") and graphical object 116 ("Button B"). Panel 108 includes controls for editing property values of graphical objects in artboard 106. Panel 108 includes a property marker 120 associated with a Background property of the selected graphical object Button A. Panel 108 may also include a single-purpose editor 122 for editing a literal value (in this example, coloring) of a graphical object property. Embodiments of the invention will be discussed below using UI 100, but it will be understood that embodiments herein are not limited to use with UI 100.

Graphical authoring tools use single-purpose controls to edit the properties of graphical objects. For example, a color picker has the single purpose of enabling the user to edit the color of a circle. In another example, a numeric input box has the single purpose of enabling the user to specify the radius of a circle. Values such as colors and numbers are literal values—values that do not depend on the operating environment or other sources (except the data store storing the literal value itself). The literal value does not change when used by the computing device in a calculation.

A non-literal value is a value that is determined from one or more sources. A non-literal value can change when used by a computing device in a calculation. For example, the width of "Button A" may be calculated from the width of "Button B". In this example, the width of Button A is not a literal value. The width of Button A is a non-literal value instructing the computer to calculate its width from Button B. Graphical objects, such as shapes and user interface controls, may have properties that support many kinds of non-literal value types and operations upon them. In one embodiment using Microsoft Windows Presentation Foundation (WPF), these properties are called dependency properties.

Single-purpose controls suffice for editing literal values in properties, but not for editing properties that can contain both literal and multiple kinds of non-literal values. The problem with single-purpose controls is that they can only operate on one kind of value, so a graphical authoring tool would need to provide one control per value type, per property. With so many controls crammed into the limited dimensions of a computer monitor, an authoring tool's user interface rapidly deteriorates into densely cluttered noise that is difficult to understand and difficult to use. However, users are familiar with the relationship between object properties and single-purpose controls in graphical authoring tools and depend on this familiar metaphor to reduce the learning curve in adopting graphical authoring tools.

Figure 2:
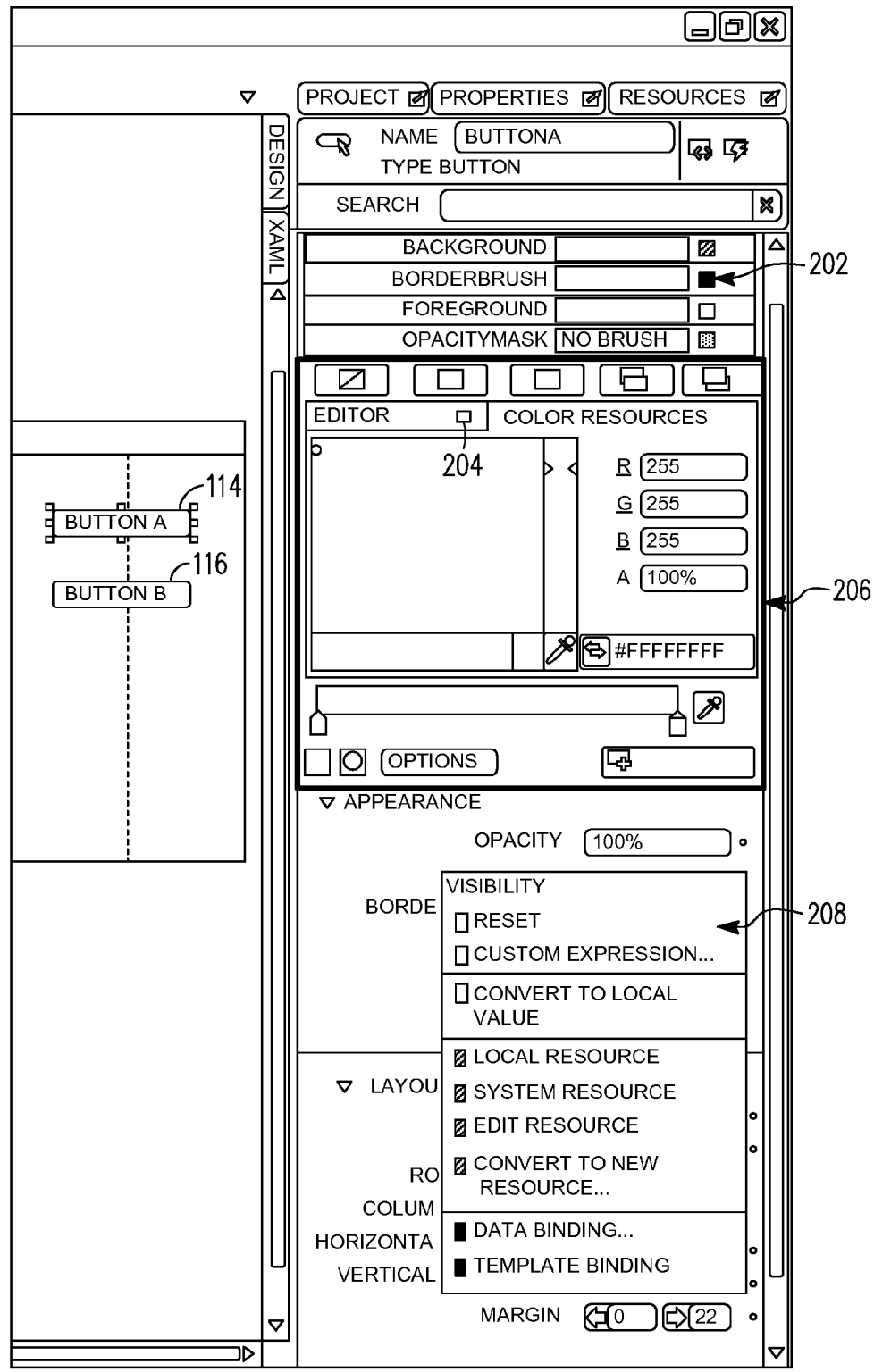
FIG. 2 is a user interface in accordance with an embodiment of the invention.

Referring to FIG. 2, a portion of UI 100 in accordance with an embodiment of the invention is shown. FIG. 2 shows various embodiments of the invention that will be presented in more detail in FIGS. 3-8. Embodiments of the invention use a visual cue, such as a tiny square called a property marker, that is associated with an object property. One skilled in the art having the benefit of this description will appreciate that a property marker may have other shapes and be located in other positions in the UI than those shown in FIGS. 1-8.

In FIG. 2, property marker 202 is associated with the Border Brush property for Button A. The property marker may use color to indicate whether the property value is a literal or a non-literal value. The color may also indicate the type of non-literal value. Various color-coding for property markers are used herein as examples, but one skilled in the art having the benefit of this description will appreciate that other coloring schemes, shading schemes, or other visual cues may be used with embodiments of the invention.

The property marker may be selected by a user to invoke operations upon the property. For example, in FIG. 2, clicking on a property marker invokes a menu 208 of operations associated with that graphical object property. The user may then select an operation from the menu.

The property marker may be placed anywhere in the software independent of other editors. The decoupling of the property marker from the single-purpose control allows the property marker to be placed anywhere in the graphical authoring tool UI, providing more flexibility for the UI layout. The traditional single-purpose control meant for editing literal values are blocked from interaction and have a color-coded border when the dependency property has a non-literal value. As shown at 206, the single-purpose control (a brush editor for editing literal brush values) is disabled and wrapped by a color-coded border that matches the property marker color when the value is non-literal (i.e., the color of border 206 matches the color of property marker 202).

In one embodiment, a property marker may target properties of objects assigned to properties. In other words, the property marker may be used on properties of properties. For example, as shown at 204, a property marker is nested inside the single-purpose control (i.e., brush editor). Because the property marker is decoupled from the single-purpose control traditionally associated with the property, a tooltip on the property marker indicates the name of the associated property. Packing all of the information and operations into the small footprint of a tiny square reduces visual clutter and allows the graphical authoring tool to retain a familiar mainstream user interface.

Figure 3:
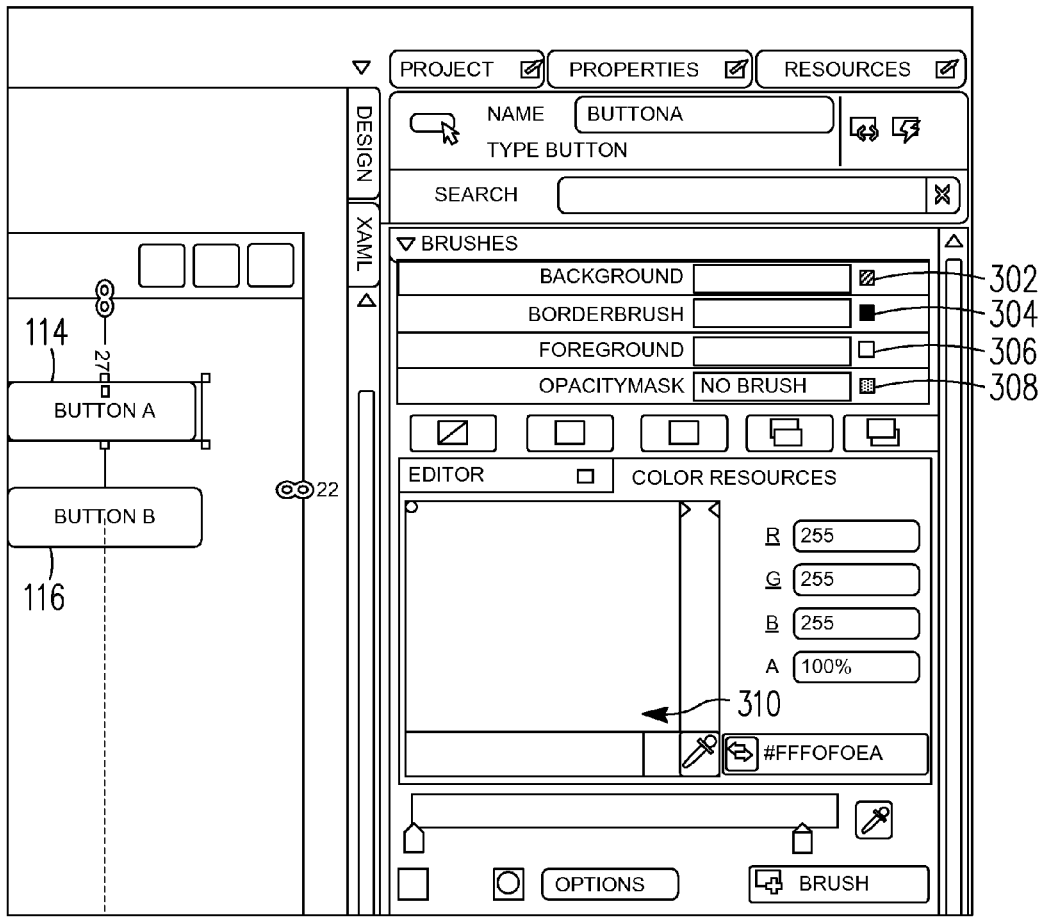
FIG. 3 is a user interface in accordance with an embodiment of the invention.

Turning to FIG. 3, a portion of UI 100 in accordance with an embodiment of the invention is shown. A property marker may use color to indicate the kind of literal or non-literal value assigned to the property. In FIG. 3, property marker 302 is associated with the Background property for Button A (Button A has been selected by the user). Since the Background property in this example has a resource reference value (a non-literal value), the property marker is colored green (shown as diagonal stripes in FIG. 3).

A non-literal value may be determined through a resource reference value (assignable through menu 208). A resource reference value may reference a resource of a computing device. In one embodiment, a resource reference may include a system resource reference. A system resource reference may be a reference to a resource of the operating system of the computing device running the graphical authoring tool or which will be running the application being created by the graphical authoring tool. The graphical authoring tool may determine a dynamic value of the indicated system resource and convert the system resource value to a property value for the graphical object. In one example, the Background property for Button A may be set to system resource reference "DesktopBrushKey". The system resource reference may be edited by changing the reference to which the property is bound or deleting the reference entirely.

In another embodiment, a resource reference may include a local resource reference. A local resource reference is associated with a resource that is stored within a project and is accessible only to a certain portion of a project. A local resource reference may be made to another resource such as other applications available through the computing device running the graphical authoring tool or available through the computing device which will be running the application being created by the graphical authoring tool. Examples of a local resource include a resource library, a resource dictionary, or the like. A resource dictionary stores resources that can be 'shared' or 'statically/dynamically referenced' by one or more properties. The local resource reference may be edited by changing the reference to which the property is bound or deleting the reference entirely.

In one embodiment, a resource reference may be characterized as a static reference or a dynamic reference depending on how the resource is looked up. Static indicates that the resource is only looked up once. Dynamic indicates the resource is looked up every time the resource value changes. In one embodiment, resource references are defaulted as dynamic references.

In FIG. 3, property marker 304 is associated with the Border Brush property of Button A. Since the Border Brush property in this example has a binding value, the property marker is colored orange (shown as solid black in FIG. 3). A non-literal value on an object property may be determined using a binding (assignable through menu 208). In one embodiment, the binding may be a data binding. The data binding may find the property value to another object property such as a property value of the same or other object, a value stored in a data store, or the like. In one example, the width of Button B may be bound to the width of Button A. Thus, the width of Button B is determined by the width of another object (i.e., Button A). However, it will be appreciated that the property types of bound properties do not need to be identical. For example, the width of Button B may be bound to any property value of another object, such as height of a text box, font size, fill color, or the like. It will also be appreciated that the bound values do not have to be of the same type or scale (e.g., both integers, both strings, etc.). The user and/or graphical authoring tool may provide a suitable conversion from one data type to another. A data binding may be edited by changing the data to which the property is bound or deleting the binding entirely.

In another embodiment, the binding may be a template binding. In this case, the non-literal value of the object property is determined by a binding to a template associated with the object having the property value. A template may set a default value source which allows the properties of the template to be inherited by object properties bound to the template. Changing a value in a template may disseminate the change to one or more objects bound to the template. It will be appreciated that a template may setup a default non-literal value source rather than a default value itself for the property. A template binding may be edited by changing the template to which the property is bound or deleting the binding entirely.

In FIG. 3, property marker 306 is associated with the Foreground property for Button A. Since the Foreground property has a literal value, property marker 306 is colored white. In this example, the literal value for the Foreground property may be edited by using the single-purpose control 310 to change the foreground color of Button A.

In FIG. 3, property marker 308 has a non-assigned default literal value. A non-assigned default literal value includes a value that is provided automatically by the system because the user has not assigned a value. Property marker 308 is colored grey to indicate the non-assigned default literal value to the user.

Figure 4:
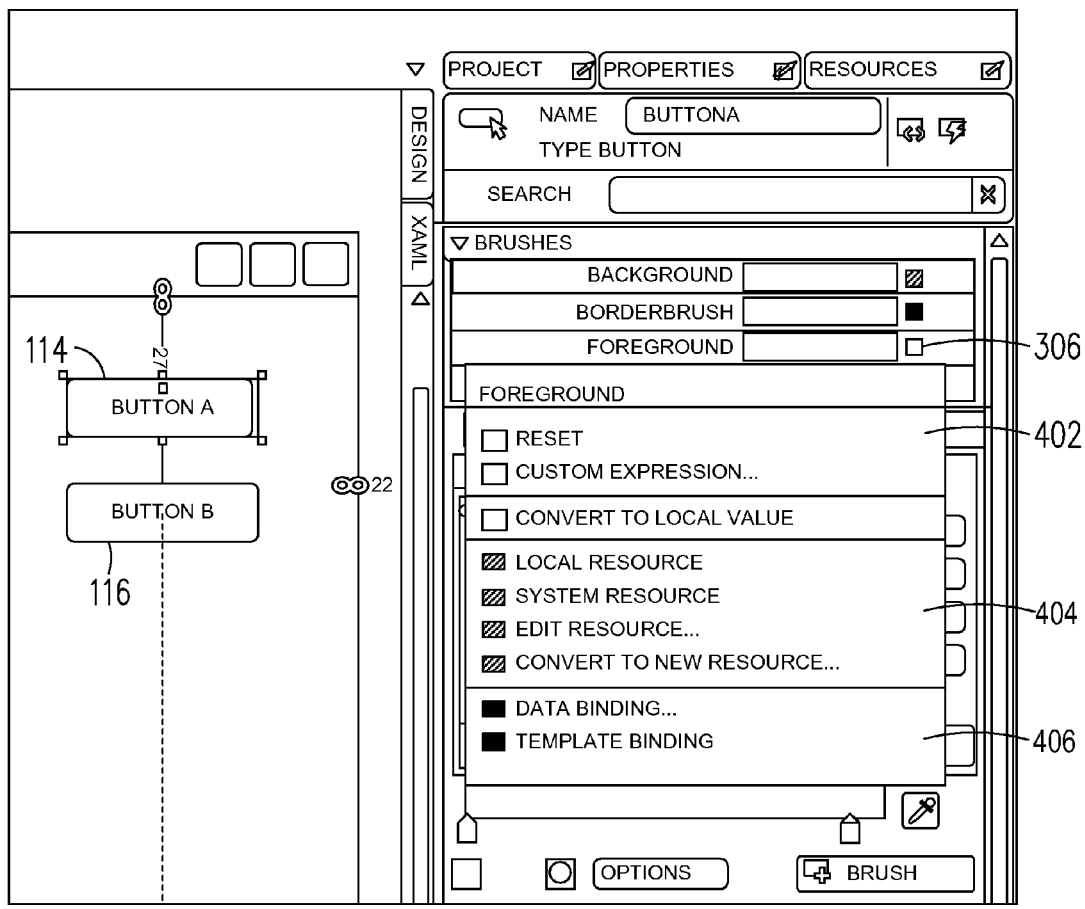
FIG. 4 is a user interface in accordance with an embodiment of the invention.

Turning to FIG. 4, a portion of UI 100 in accordance with an embodiment of the invention is shown. Selecting a property marker reveals a menu of operations that can assign different kinds of literal and non-literal values to the property. A user may select the property marker with a cursor by clicking, hovering, rolling over, and the like, as well as other methods for selecting an item in a UI.

In FIG. 4, clicking on property marker 306 for the Foreground property brings up menu 402. Menu 402 includes the following operations that may be performed on the property value: reset, custom, convert to local value, assign local resource, assign system resource, edit resource, convert to new resource, assign data binding, and assign template binding. Menus for other properties may include similar operations. In menu 402, the operations are color-coded with the same color used as the result of the operation to a literal or non-literal value type. For example, shown at 404, the operation to assign a system resource to a property is color-coded green (shown as diagonal stripes). The same green color will fill property marker 306 after the system resource is assigned to the Foreground property. In another example, shown at 406, operations associated with binding values are color-coded orange (shown as solid black). Invalid operations in menu 402 are disabled and have slightly faded colors. Operations are shown in the menu even if they are invalid because the invalid state is in itself a useful piece of information. Examples of invalid operations include cannot assign a resource reference because there are not resources to reference and cannot reset to default value because the property already uses the default value.

Figure 5:
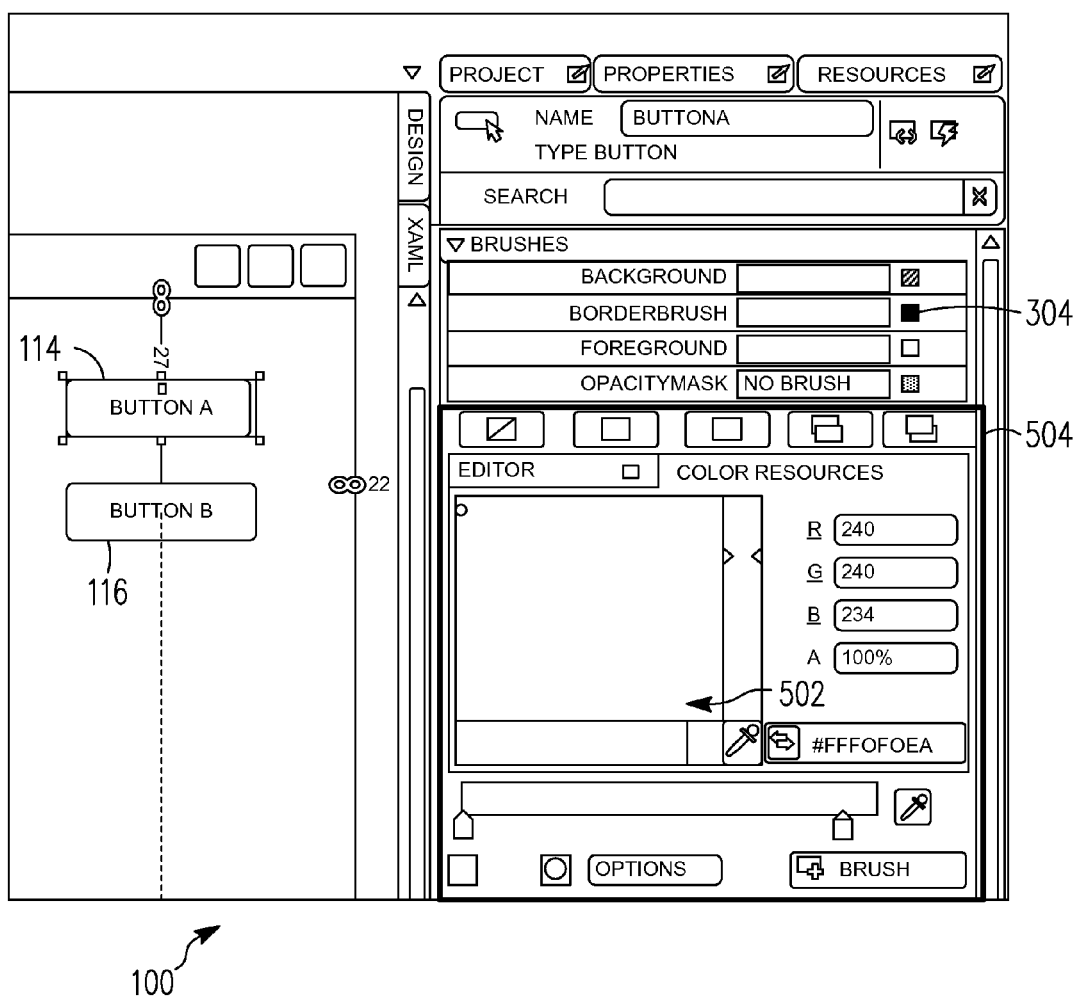
FIG. 5 is a user interface in accordance with an embodiment of the invention.

Turning to FIG. 5, a portion of UI 100 in accordance with an embodiment of the invention is shown. FIG. 5 shows blocking of a single-purpose control for non-literal values. Single-purpose controls that can only edit literal values are of no use when a property has a non-literal value, such as a binding or resource reference. In such a case, the single-purpose control has a color-coded border 504 where the color matches the color coding for the non-literal value type. Also, the single-purpose control is disabled so that the user does not override the non-literal value by mistake.

In FIG. 5, property marker 304 for the Border Brush property of Button A is colored orange (shown as solid black) to indicate a binding (i.e., a non-literal value). Single-purpose control 502 (a literal value color editor) for the Border Brush property has been disabled since the Border Brush property has been assigned a non-literal value. Also, single-purpose control 502 has an orange border 504 (shown as solid black). The orange color-coding matches the orange color-coding used in property marker 304 (and also matches the orange color-coding for binding in a menu of operations if the user clicks on property marker 304).

Figure 6:
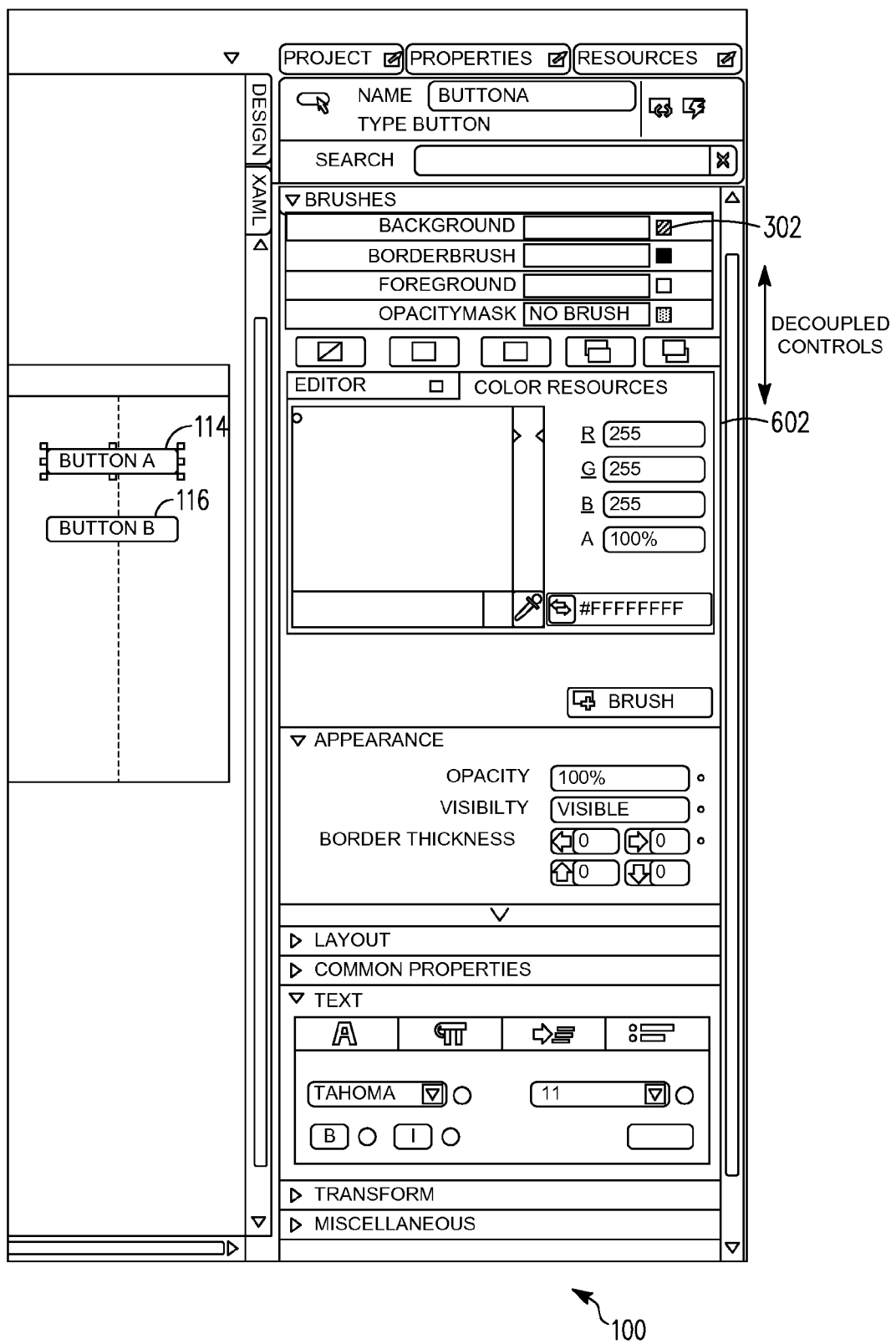
FIG. 6 is a user interface in accordance with an embodiment of the invention.

Turning to FIG. 6, a portion of UI 100 in accordance with an embodiment of the invention is shown. In FIG. 6, a property marker and a single-purpose control are decoupled from each other yet they are associated with the same property. In other words, they are separate controls. A property marker and a single-purpose control can both be associated with the same dependency property, but they can be arranged within a user interface independent of each other. This decoupling of controls provides greater flexibility in UI layouts for the graphical authoring tool. This is an improvement over traditional property grids in authoring tools where property labels, editors, and popup commands are constrained to the same row in a list of properties.

In FIG. 6, property marker 302 is associated with the Background property for object Button A. Single-purpose control 602 for editing literal brush values is associated with the Background property for object Button A. Thus, two controls (i.e., marker 302 and control 602) have a common association with the Background property but the two controls are decoupled from one another. The two controls may be placed at different locations in UI 100 and operate independent of each other but still retain their associations with the Background property.

Figure 7:
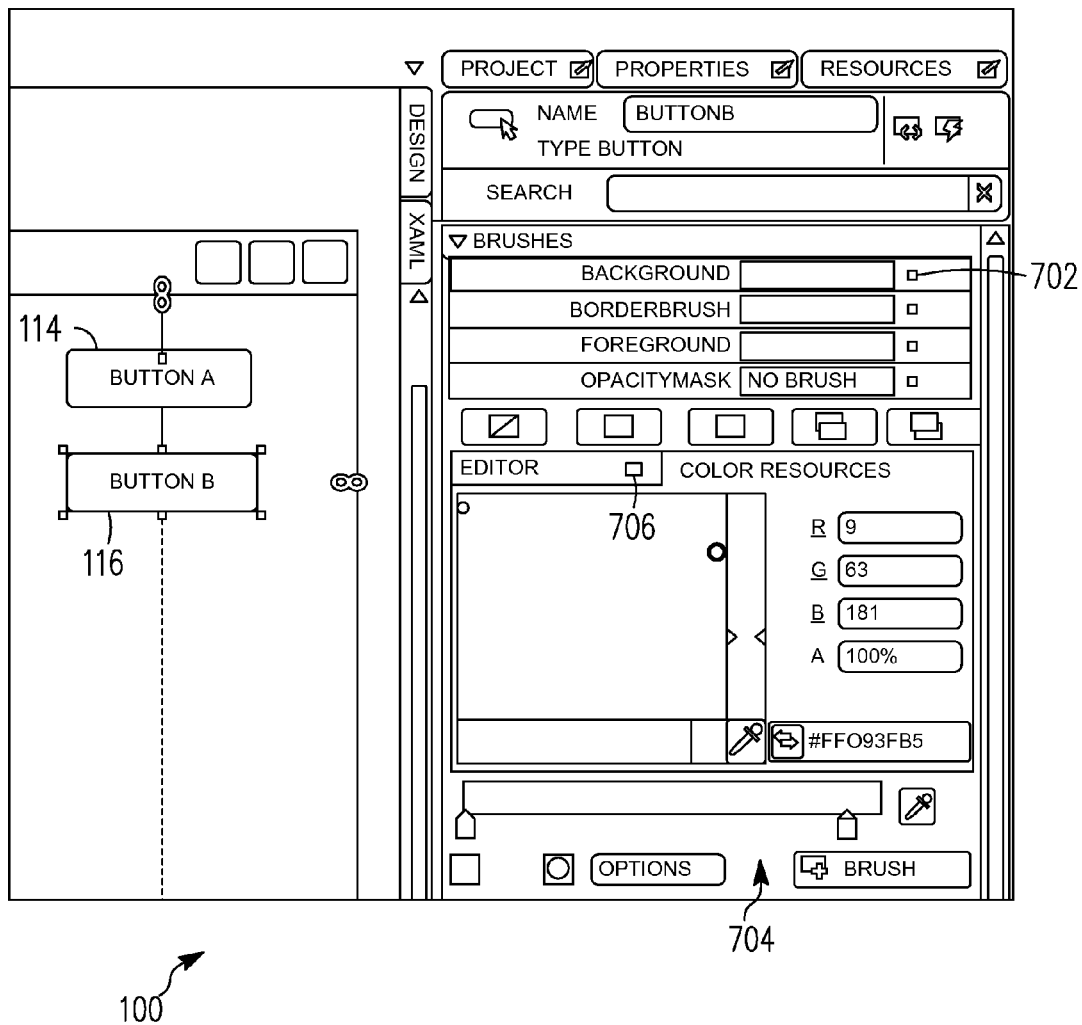
FIG. 7 is a user interface in accordance with an embodiment of the invention.

Turning to FIG. 7, a portion of UI 100 in accordance with an embodiment of the invention is shown. Decoupling of property markers from single-purpose controls also means that property markers can be used to target properties of properties (also known as "complex properties"). The property marker in a single-purpose control is used to denote the state of the property beyond what the single-purpose control can denote, and the marker also acts as a button for the user to invoke a menu of operations beyond what the single-purpose control can perform. For example, in FIG. 7, the Background property for Button B has associated property marker 702. Property marker 702 may contain a separate value from property marker 706 that is associated with single-purpose control (i.e., brush editor) 704.

In another example, property marker 702 may be colored white to indicate the property value is a literal value. The user may assign the literal value using single-purpose control 704. However, the user may select property marker 706 and assign a non-literal value, such as a resource reference, to the single-purpose editor 706. Selecting a resource reference value would result in property marker 706 being colored green. Thus, in this example, property marker 702 would be colored white (literal value from single-purpose control 704) and property marker 706 would be colored green (the control 704 receives its "literal" value from a resource reference).

Figure 8:
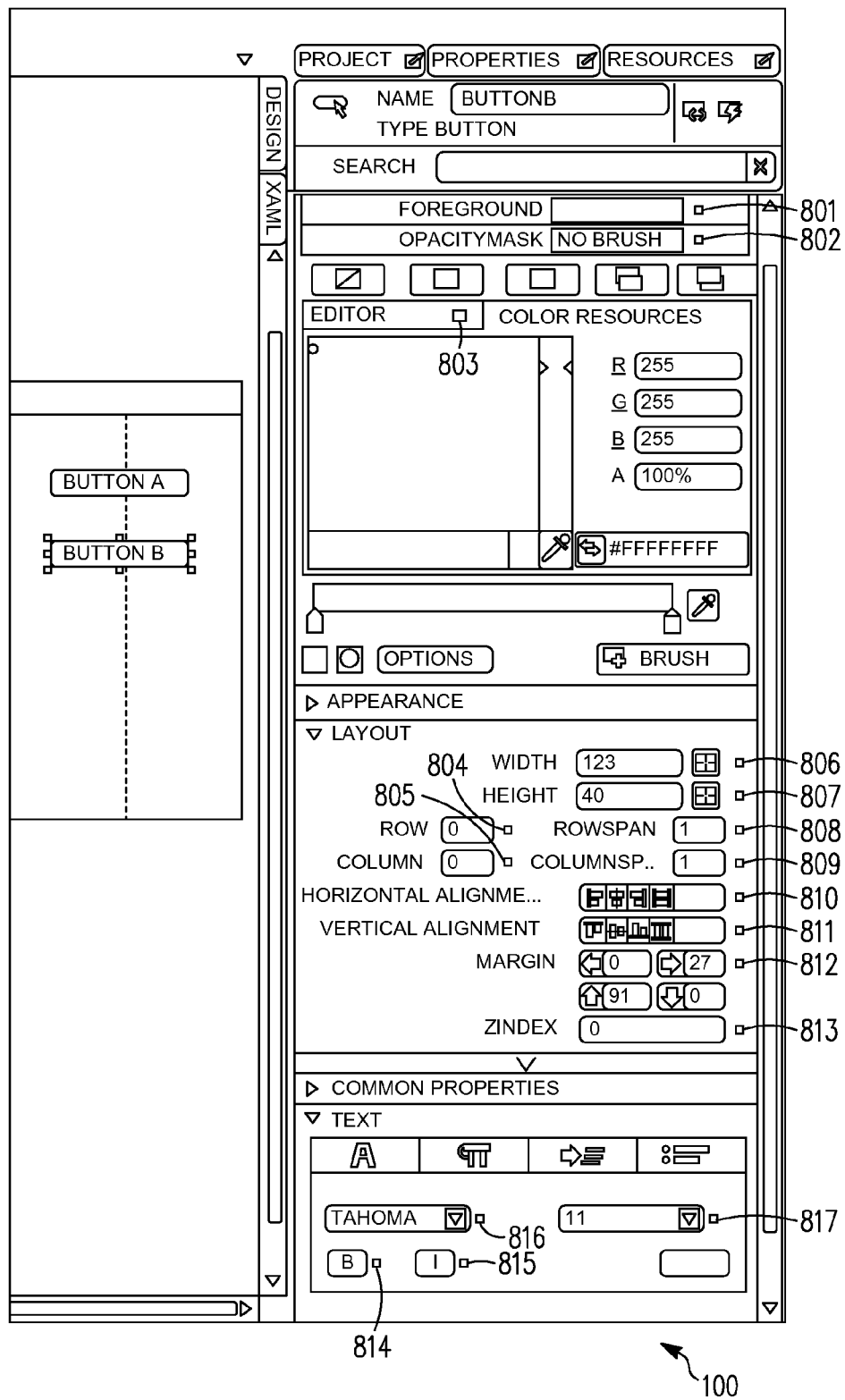
FIG. 8 is a user interface in accordance with an embodiment of the invention.

Turning to FIG. 8, a portion of UI 100 in accordance with an embodiment of the invention is shown. FIG. 8 demonstrates that the small footprint size of the property marker means that the property marker does not take up much space in UI 100 and informs the user about the status of various properties without distracting the user. In FIG. 8, 17 property markers 801-817 are shown in just a portion of UI 100.

Figure 9:
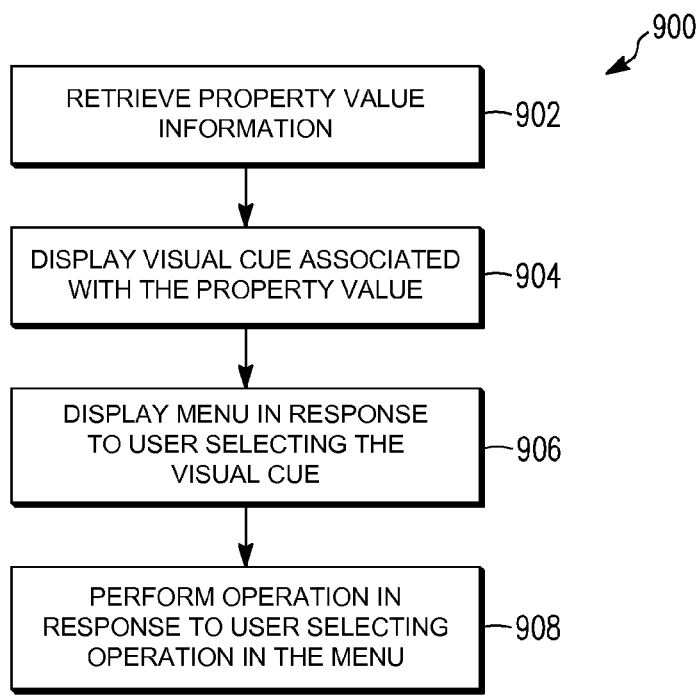
FIG. 9 is a flowchart showing the logic and operations of displaying a property marker in accordance with an embodiment of the invention.

Turning to FIG. 9, a flowchart 900 shows the logic and operations of displaying a property marker in accordance with an embodiment of the invention. In one embodiment, at least a portion of the logic of flowchart 900 may be implemented by computer readable instructions executable by one or more computing devices. In one embodiment, the logic of flowchart 900 is implemented by a graphical authoring tool.

Starting in a block 902, property value information associated with a graphical object property is retrieved. Next, in block 904, a visual cue associated with the property value is displayed in the UI. In one embodiment, the visual cue includes a property marker that is color-coded to indicate whether the property value is a literal or a non-literal value and, in some cases, the non-literal value type (e.g., resource reference, binding, etc.).

Continuing to block 906, a menu of operations is displayed in response to a user selecting the visual cue. In one embodiment, the operations in the menu are displayed with a visual cue that indicates the type of non-literal value assigned to the property as a result of performing the operation. The menu of operations may include resetting the property value to a default value, assigning a non-literal value to the property value, and assigning a non-literal value to the property value. In one example of assigning a non-literal value, the property value may be changed from a literal value to a non-literal value. In another example of assigning a non-literal value, the property value may be changed from one type of non-literal value to another type of non-literal value (e.g., from a resource reference to a binding). Next, in block 908, an operation associated with the property is performed in response to the user selecting the operation in the menu.

Figure 10:
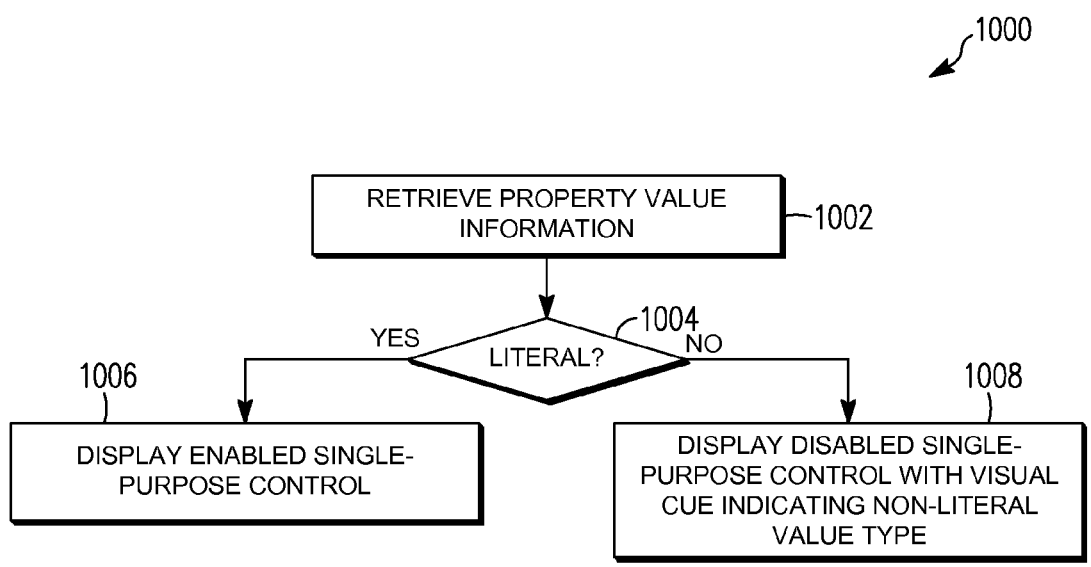
FIG. 10 is a flowchart showing the logic and operations of displaying a single-purpose control in accordance with an embodiment of the invention.

Turning to FIG. 10, a flowchart 1000 shows the logic and operations of displaying a single-purpose control in accordance with an embodiment of the invention. In one embodiment, at least a portion of the logic of flowchart 1000 may be implemented by computer readable instructions executable by one or more computing devices. In one embodiment, the logic of flowchart 1000 is implemented by a graphical authoring tool.

Starting in block 1002, property value information associated with a property is retrieved. Next, in decision block 1004, the logic determines if the property value is a literal value. If the answer is yes, then the single-purpose control for the property value is displayed and enabled for use, as shown in block 1006. If the answer to decision block 1004 is no, then the single-purpose control for the property value is displayed, but disabled for use. The single-purpose control is disabled to prevent a user from accidently using the single-purpose control to change the property value from a non-literal value to a literal value. Also, in one embodiment, a visual cue is displayed with the single-purpose control that indicates the non-literal value type. For example, the single-purpose control may be surrounded by a color-coded border where the color indicates the non-literal value type assigned to the property (e.g., a resource reference, a binding, etc.).

Embodiments of the invention provide a space-saving user interface visual cue for use with literal values and non-literal values in a graphical authoring tool. A visual cue, such as a property marker, may use color to indicate a literal or non-literal value for a property value and be selectable for revealing a menu of property value operations. Also, the property marker may be decoupled from a single-purpose control used for changing literal values of the property value. This decoupling provides greater flexibility in the graphical authoring tool UI layout and enables targeting of complex properties.

Figure 11:
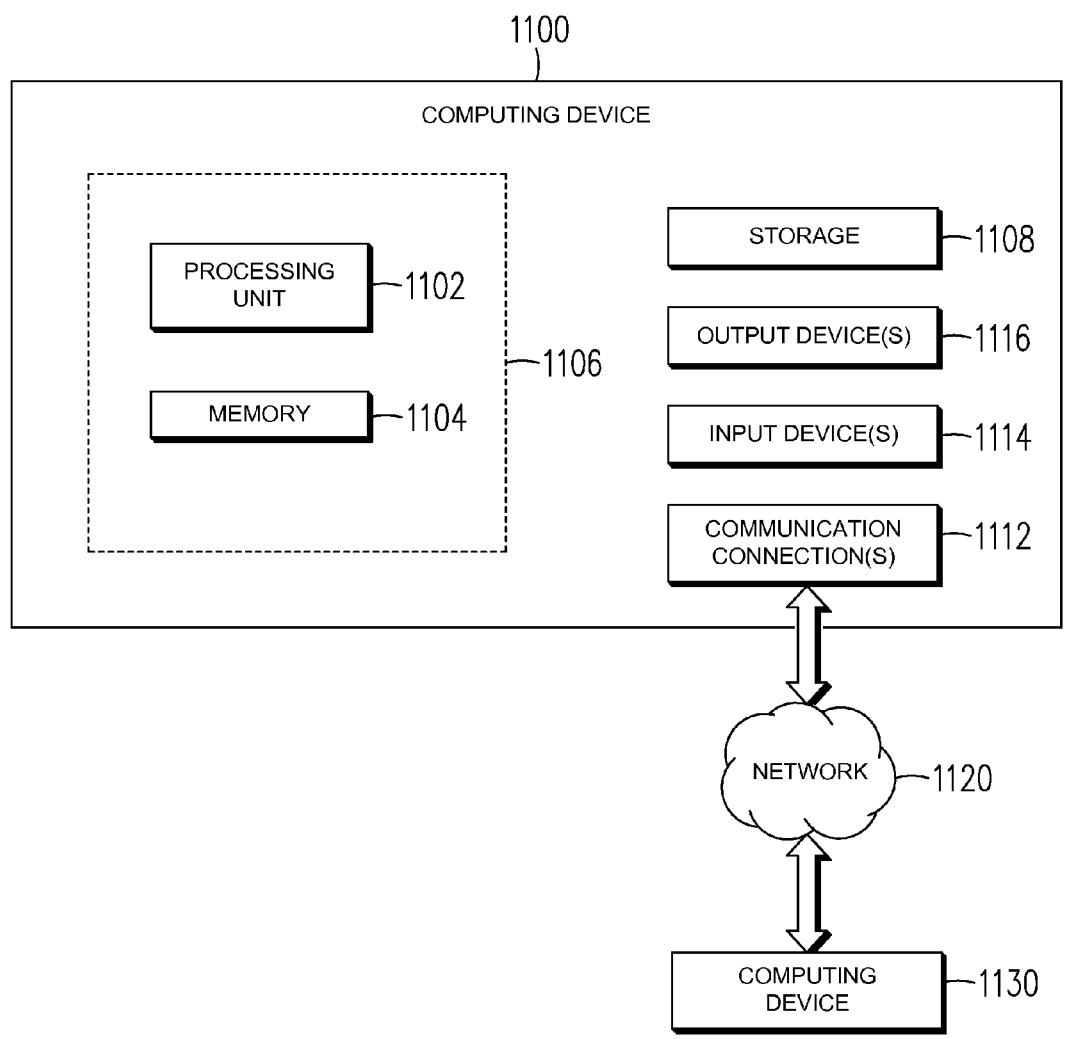
FIG. 11 is a block diagram of an example computing device for implementing embodiments of the invention.

FIG. 11 and the following discussion are intended to provide a brief, general description of a suitable computing environment to implement embodiments of the invention. The operating environment of FIG. 11 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 shows an example of a computing device 1100 for implementing one or more embodiments of the invention. In one configuration, computing device 1100 includes at least one processing unit 1102 and memory 1104. Depending on the exact configuration and type of computing device, memory 1104 may be volatile (such as RAM), non-volatile (such as ROM, flash memory, etc.) or some combination of the two. This configuration is illustrated in FIG. 11 by dashed line 1106.

In other embodiments, device 1100 may include additional features and/or functionality. For example, device 1100 may also include additional storage (e.g., removable and/or non-removable) including, but not limited to, magnetic storage, optical storage, and the like. Such additional storage is illustrated in FIG. 11 by storage 1108. In one embodiment, computer readable instructions to implement embodiments of the invention may be in storage 1108. For example, storage 1108 may have stored computer readable instructions to implement a graphical authoring tool that includes embodiments of UI 100 as described herein. Storage 1108 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 1104 and storage 1108 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1100. Any such computer storage media may be part of device 1100.

Device 1100 may also include communication connection(s) 1112 that allow device 1100 to communicate with other devices. Communication connection(s) 1112 may include, but is not limited to, a modem, a Network Interface Card (NIC), an integrated network interface, a radio frequency transmitter/receiver, an infrared port, a USB connection, or other interfaces for connecting computing device 1100 to other computing devices. Communication connection(s) 1112 may include a wired connection or a wireless connection. Communication connection(s) 1112 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 1100 may include input device(s) 1114 such as keyboard, mouse, pen, voice input device, touch input device, infrared cameras, video input devices, and/or any other input device. Output device(s) 1116 such as one or more displays, speakers, printers, and/or any other output device may also be included in device 1100. Input device(s) 1114 and output device(s) 1116 may be connected to device 1100 via a wired connection, wireless connection, or any combination thereof. In one embodiment, an input device or an output device from another computing device may be used as input device(s) 1114 or output device(s) 1116 for computing device 1100.

Components of computing device 1100 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1100 may be interconnected by a network. For example, memory 1104 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 1130 accessible via network 1120 may store computer readable instructions to implement one or more embodiments of the invention. Computing device 1100 may access computing device 1130 and download a part or all of the computer readable instructions for execution. Alternatively, computing device 1100 may download pieces of the computer readable instructions, as needed, or some instructions may be executed at computing device 1100 and some at computing device 1130. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A computer readable storage media including computer readable instructions that when executed perform acts, comprising:
   retrieving a literal property value associated with a literal property of a graphical object;
   displaying a first visual cue associated with the literal property value;
   retrieving a non-literal property value associated with a non-literal property of the graphical object;
   displaying, concurrently with the first visual cue, a second visual cue associated with the non-literal property value, wherein the first visual cue and the second visual cue have different appearances to indicate that the first visual cue is associated with the literal property value, and that the second visual cue is associated with the non-literal property value,
   wherein:
      the first visual cue and the second visual cue are displayed in a manner that is decoupled from the graphical object;
      the literal property value is user-adjustable using a single-purpose control; and
      the non-literal property value is dependent on a property of an object other than the graphical object.

2. The computer readable storage media of claim 1, the acts further comprising:
   displaying a menu of operations associated with the literal property in response to a selection of the first visual cue; and
   performing an operation associated with the literal property in response to a user selecting the operation in the menu.

3. The computer readable storage media of claim 2, wherein the operation includes changing the literal property value to a non-literal value.

4. The computer readable storage media of claim 2, the acts further comprising:
   displaying a menu of operations associated with the non-literal property in response to a selection of the second visual cue; and
   changing a non-literal value type of the non-literal property value to a different non-literal value type.

5. The computer readable storage media of claim 1, the acts further comprising:
   enabling and displaying the single-purpose control.

6. The computer readable storage media of claim 1, the acts further comprising:
   displaying a disabled single-purpose control associated with the non-literal property value.

7. The computer readable storage media of claim 6, the acts further comprising:
   displaying the second visual cue with the disabled single-purpose control indicating a non-literal value type of the non-literal property value.

8. The computer readable storage media of claim 1 wherein the non-literal property value includes one of: a resource reference value or a binding value.

9. One or more computer readable storage media including computer readable instructions that when executed perform acts comprising:

retrieving a first property value associated with a first property of a graphical object;

displaying a first property marker associated with the first property value in a user interface; and displaying a second property marker associated with a second property value of the graphical object in the user interface, the second property marker being different than the first property marker, wherein:

the first property marker is nested inside a single-purpose control that is associated with the graphical object, and the first property marker and the second property marker are displayed with different appearances to indicate whether the first property value and the second property value are:

literal values, or non-literal values that are dependent on a property of an object other than the graphical object.

10. The one or more computer readable storage media of claim 9, the acts further comprising:

displaying a menu of operations associated with the first property in the user interface in response to the first property marker being selected; and performing an operation associated with the first property in response to a user selecting the operation in the menu.

11. The one or more computer readable storage media of claim 10 wherein the operation includes changing the first property value from a literal value to a non-literal value.

12. The one or more computer readable storage media of claim 10 wherein the operation includes changing a non-literal value type of the first property value.

13. The one or more computer readable storage media of claim 9, the acts further comprising:

displaying an enabled single-purpose control associated with the first property value when the first property value is a literal value.

14. The one or more computer readable storage media of claim 9, the acts further comprising:

displaying a disabled single-purpose control associated with the first property value when the first property value is a non-literal value.

15. The one or more computer readable storage media of claim 14, the acts further comprising:

displaying a color-coded border around the disabled single-purpose control, wherein a color of the color-coded border indicates a non-literal value type of the non-literal value.

16. The one or more computer readable storage media of claim 9 wherein the non-literal values include resource reference values or binding values.

17. A method in a computing device for providing user interaction with a graphical authoring tool user interface on a display, comprising:

retrieving a property value associated with a property of a graphical object displayed in the graphical authoring tool user interface;

in an instance where the property value is a literal value:

displaying a property marker having a first appearance, the property marker being associated with the property of the graphical object, the first appearance indicating that the property value is a literal value; and enabling a single-purpose control associated with the property value in the graphical authoring tool user interface; and in an instance where the property value is a non-literal value that is dependent on a property of an object other than the graphical object:

displaying the property marker having a second appearance that is different from the first appearance, the second appearance indicating that the property value is a non-literal value; and disabling the single-purpose control associated with the property value in the graphical authoring tool user interface, wherein the disabled single-purpose control includes a color-coded border that indicates a non-literal value type of the non-literal value.

18. The method of claim 17 wherein the property marker and the single-purpose control are separate controls that may be positioned independently of each other in the graphical authoring tool user interface.

19. The method of claim 17 wherein the single-purpose control includes a second property marker associated with a second property value of the single-purpose control.

20. The method of claim 17, further comprising:

displaying a menu of operations associated with the property in the graphical authoring tool user interface in response to the property marker being selected, wherein an individual operation is displayed with a visual cue indicating a non-literal value type of the property value as a result of performing the individual operation; and performing the individual operation in response to a user selecting the individual operation in the menu.

* * * * *